United States Patent
DiMarco

(10) Patent No.: US 9,421,442 B2
(45) Date of Patent: Aug. 23, 2016

(54) GOLF CLUB SCREW

(71) Applicant: CALLAWAY GOLF COMPANY, Carlsbad, CA (US)

(72) Inventor: Thomas J. DiMarco, Oceanside, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 14/798,828

(22) Filed: Jul. 14, 2015

(65) Prior Publication Data

US 2016/0016055 A1 Jan. 21, 2016

Related U.S. Application Data

(60) Provisional application No. 62/026,217, filed on Jul. 18, 2014.

(51) Int. Cl.
*A63B 53/04* (2015.01)
*A63B 53/08* (2015.01)
*F16B 23/00* (2006.01)

(52) U.S. Cl.
CPC .................. *A63B 60/52* (2015.10); *A63B 53/04* (2013.01); *F16B 23/00* (2013.01); *A63B 2053/0491* (2013.01); *A63B 2209/00* (2013.01)

(58) Field of Classification Search
CPC ......... A63B 57/00; F16B 23/00; F16B 39/00; F16B 39/282; F16B 39/284; F16B 39/286; F16B 39/24; F16B 39/36
USPC ............ 473/131, 219, 407; 411/49, 306, 312, 411/314, 317, 319, 324, 333, 341, 342, 347, 411/352, 360, 362, 399, 408, 500, 501, 502, 411/508, 998, 305, 339, 378, 383, 392, 900, 411/955
See application file for complete search history.

(56) References Cited

U.S. PATENT DOCUMENTS

| | | | | |
|---|---|---|---|---|
| 1,133,129 A * | 3/1915 | Govan | ................ | A63B 53/047 473/337 |
| 2,833,325 A * | 5/1958 | Laisy | ...................... | F16B 35/06 411/260 |
| 3,556,533 A * | 1/1971 | Hollis | .................... | A63B 53/04 411/900 |
| 3,652,094 A * | 3/1972 | Glover | ................... | A63B 53/08 473/337 |
| 3,821,871 A * | 7/1974 | Schmitt | ................... | F16B 4/004 29/524.1 |
| 4,111,580 A * | 9/1978 | Falcioni | .................. | F16B 35/06 403/284 |
| 4,795,159 A * | 1/1989 | Nagamoto | ............. | A63B 53/04 473/338 |
| 5,251,901 A * | 10/1993 | Solheim | ................. | A63B 53/04 473/338 |
| 5,582,553 A * | 12/1996 | Ashcraft | ................ | A63B 53/04 473/338 |
| 6,033,318 A * | 3/2000 | Drajan, Jr. | ............. | A63B 53/02 473/309 |
| 6,193,614 B1 * | 2/2001 | Sasamoto | ............. | A63B 53/04 473/329 |
| 6,290,609 B1 * | 9/2001 | Takeda | ................. | A63B 53/047 473/335 |
| 7,419,441 B2 * | 9/2008 | Hoffman | ............ | A63B 53/0466 473/334 |
| 7,500,924 B2 * | 3/2009 | Yokota | ............... | A63B 53/0466 473/332 |
| 7,582,024 B2 * | 9/2009 | Shear | ................. | A63B 53/0466 473/329 |

(Continued)

*Primary Examiner* — William Pierce
(74) *Attorney, Agent, or Firm* — Rebecca Hanovice; Michael Catania; Sonia Lari

(57) ABSTRACT

A screw for use with a golf club head is disclosed herein. The screw comprises a head portion with a compressible feature that more securely retains the screw within a receptacle in the golf club head. The compressible feature preferably is a plurality of tapered extensions that can be compressed inwards by a tapered portion of the receptacle, creating spring tension between the head of the screw and the tapered portion of the receptacle. This helps to prevent the screw from becoming dislodged from the golf club head when it is in use.

6 Claims, 2 Drawing Sheets

(56) References Cited

U.S. PATENT DOCUMENTS

| | | | | |
|---|---|---|---|---|
| 7,628,707 | B2 * | 12/2009 | Beach | A63B 53/0466 116/222 |
| 7,744,484 | B1 * | 6/2010 | Chao | A63B 53/0466 473/324 |
| 8,235,841 | B2 * | 8/2012 | Stites | A63B 53/0466 473/328 |
| 8,403,771 | B1 * | 3/2013 | Rice | A63B 53/04 473/328 |
| 8,430,763 | B2 * | 4/2013 | Beach | A63B 53/06 473/307 |
| 8,753,227 | B1 * | 6/2014 | Cackett | A63B 53/06 411/383 |
| 8,900,069 | B2 * | 12/2014 | Beach | A63B 53/06 473/329 |
| 8,915,688 | B2 * | 12/2014 | Dawson | F16B 35/04 411/383 |
| 9,067,110 | B1 * | 6/2015 | Seluga | A63B 53/06 |
| 2002/0137576 | A1 * | 9/2002 | Dammen | A63B 53/04 473/336 |
| 2004/0192463 | A1 * | 9/2004 | Tsurumaki | A63B 53/0466 473/329 |
| 2009/0131200 | A1 * | 5/2009 | Akinori | A63B 53/0466 473/337 |
| 2011/0021284 | A1 * | 1/2011 | Stites | A63B 53/0466 473/329 |
| 2012/0142447 | A1 * | 6/2012 | Boyd | A63B 60/54 473/329 |
| 2014/0187347 | A1 * | 7/2014 | Yamamoto | A63B 53/047 473/335 |
| 2014/0356094 | A1 * | 12/2014 | Revel | F16B 39/02 411/82.5 |
| 2015/0104270 | A1 * | 4/2015 | Dobbin | F16B 19/06 411/399 |

\* cited by examiner

GOLF CLUB SCREW

CROSS REFERENCES TO RELATED APPLICATIONS

The present application claims priority to U.S. Provisional Patent Application No. 62/026,217, filed on Jul. 18, 2014, the disclosure of which is hereby incorporated by reference in its entirety herein.

STATEMENT REGARDING FEDERALLY SPONSORED RESEARCH OR DEVELOPMENT

Not Applicable

BACKGROUND OF THE INVENTION

1. Field of the Invention

The present invention relates to a golf club screw. More specifically, the present invention relates to screw that can be used to secure pieces of a golf club head together and/or provide additional weight for a golf club head.

2. Description of the Related Art

The prior art discloses many different types of golf club screws that can be used to fix different portions of a golf club head together and/or adjust the overall golf club head weight. For example, U.S. Pat. No. 6,773,360 discloses removable weights composed of multiple pieces, some of which have tapered sides, U.S. Pat. No. 7,632,194 discloses a unitary weight with a stop portion, and U.S. Pat. No. 7,771,290 discloses a weight composed of a cap, a slug, and a retainer.

The problem with the prior art lies in the fact that the screws disclosed therein, or pieces thereof, may come loose or "back out" of their respective ports or receptacles from vibrations when the golf club head is in play, and may readily fall out if the golfer does not adequately tighten them. The prior art has not provided a golf club screw that is more securely retained within a weight port or receptacle of a golf club head, such that it is more difficult for the screw to become disengaged from the golf club head during use but is not permanently fixed to the golf club head.

BRIEF SUMMARY OF THE INVENTION

One aspect of the present invention is a screw comprising a head with a compressible portion and a threaded engagement portion.

Another aspect of the present invention is a golf club head comprising a weight port, and a screw comprising a head comprising a stem, a plurality of extensions extending upwards and away from a base of the stem, and a channel disposed between the plurality of extensions and the stem, and a threaded engagement portion. The screw may further comprise a plurality of slots, and each of the plurality of extensions may be separated from other extensions by at least two of the plurality of slots. In some embodiments, each of the plurality of extensions may comprise an exterior surface, which may comprise a first taper slope. In other embodiments, the golf club head may further comprise a keyed bore insert, and the head of the screw may comprise a recess sized to receive the keyed bore insert.

In a further embodiment, the screw may be composed of a first material, the keyed bore insert may be composed of a second material, and the first material may be different from the second material. In another embodiment, the second material may have a higher density than the first material, and in a further embodiment, the second material may be a tungsten alloy and the first material may be a steel material. In some embodiments, the keyed bore insert may be permanently affixed within the recess via a process selected from the group consisting of welding, brazing, and soldering, while in other embodiments the keyed bore insert may be removably affixed within the recess.

Yet another aspect of the present invention is a golf club head comprising a body comprising a receptacle and a screw comprising a head portion and a threaded engagement portion, wherein the receptacle comprises a conical portion and a threaded bore, wherein the head portion comprises a compressible feature having a first taper slope, wherein the conical portion comprises a second taper slope that is steeper than the first taper slope, wherein the head portion fits within the conical portion and the threaded engagement portion is sized to engage with the threaded bore, and wherein the second taper slope compresses the compressible feature when the screw is fully engaged with the receptacle. In some embodiments, the compressible feature may be a plurality of tapered extensions. In a further embodiment, the head portion may further comprise a stem, a channel disposed between the stem and the plurality of tapered extensions, and a plurality of slots, and each of the plurality of tapered extensions may be separated from other tapered extensions by at least two of the plurality of slots.

In some embodiments, the golf club head may further comprise a keyed bore insert, the head portion of the screw may further comprise a recess, and the keyed bore insert may be sized to fit within the recess. In a further embodiment, the keyed bore insert may be composed of a first material, the screw may be composed of a second material, and the first material may differ from the second material. In some embodiments, the second material, which may be a tungsten alloy, may have a higher density than the first material, which may be a steel material.

Yet another aspect of the present invention is a golf club head comprising a body comprising a receptacle, a screw comprising a head portion and a threaded engagement portion, and a keyed bore insert, wherein the receptacle comprises a conical portion and a threaded bore, wherein the head comprises a recess sized to receive the keyed bore insert, wherein the head portion comprises plurality of tapered extensions, wherein at least one of the plurality of tapered extensions comprises a first taper slope, wherein the conical portion comprises a second taper slope that is steeper than the first taper slope, wherein the head portion fits within the conical portion and the threaded engagement portion is sized to engage with the threaded bore, and wherein the second taper slope compresses the plurality of tapered extensions when the screw is fully engaged with the receptacle. In some embodiments, the head portion may be composed of a first material, the keyed bore insert may be composed of a second material, and the first material may be different from the second material. In a further embodiment, the keyed bore insert may be composed of a tungsten alloy, and in other embodiments, the keyed bore insert may be removably affixed within the recess.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
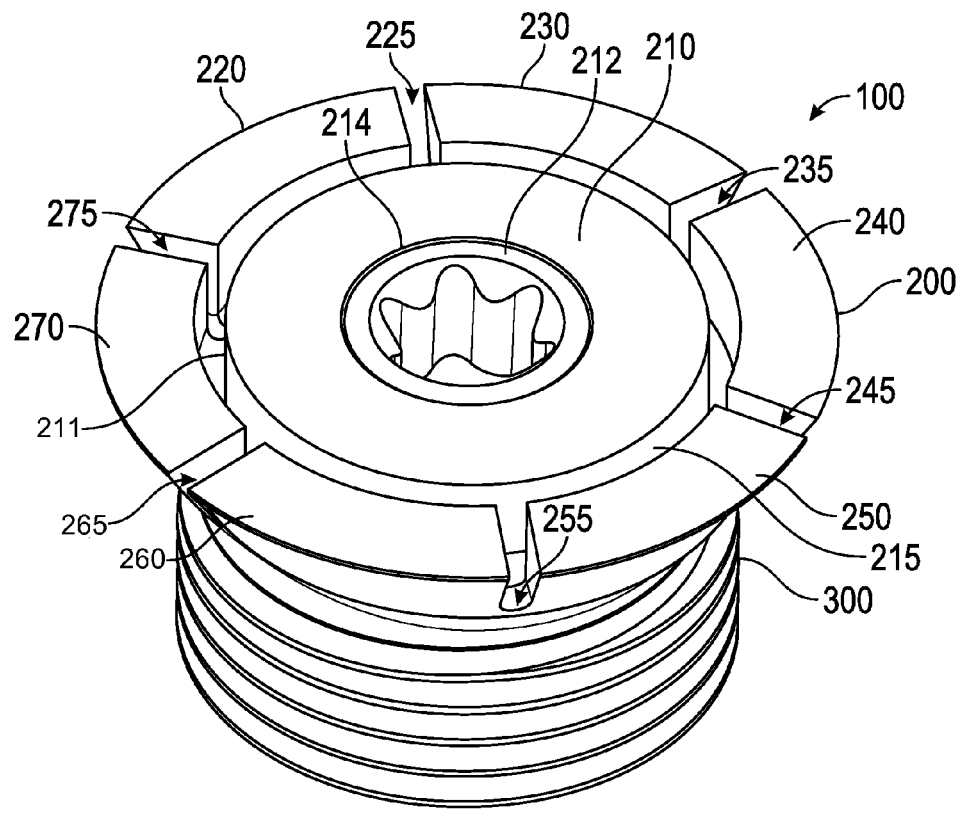
FIG. 1 is a top perspective view of a preferred embodiment of the present invention.
Figure 2:
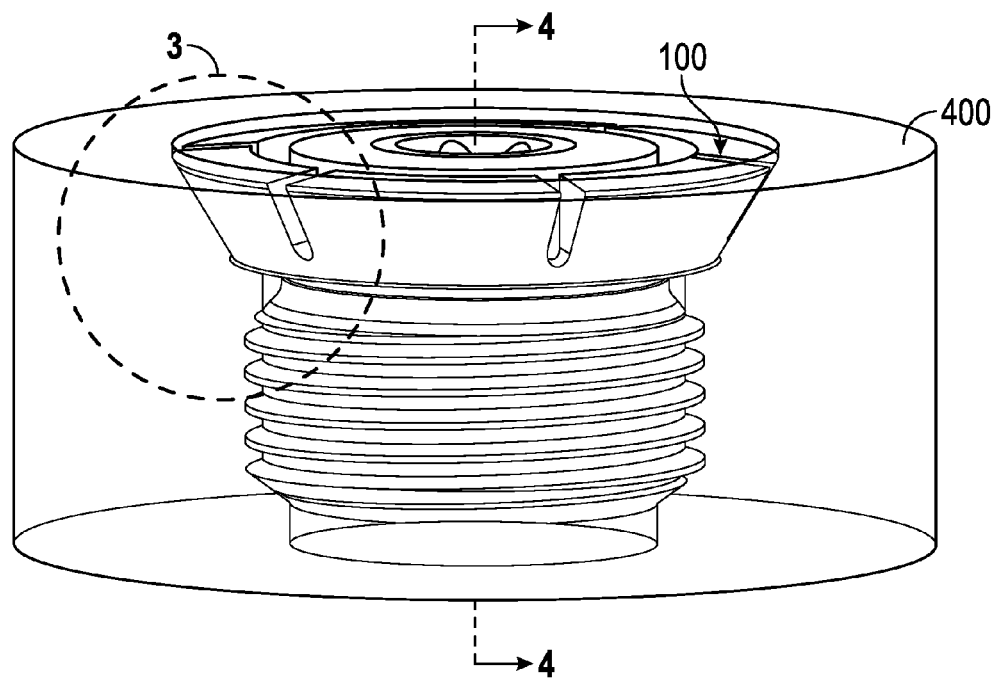
FIG. 2 is a side perspective view of the embodiment shown in FIG. 1 engaged with an exemplary weight port, which is shown in transparent view.
Figure 3:
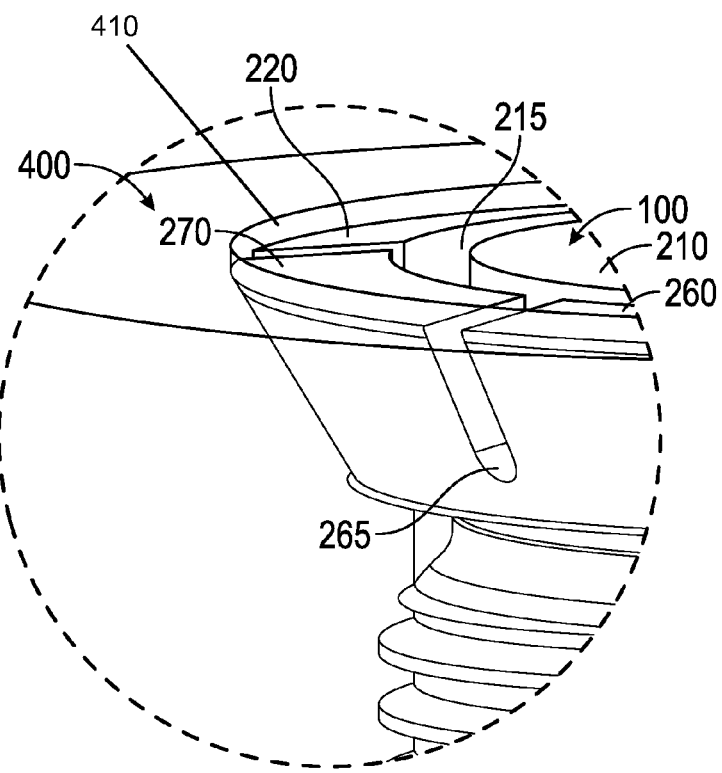
FIG. 3 is an enlarged view of the portion circled in FIG. 2.
Figure 4:
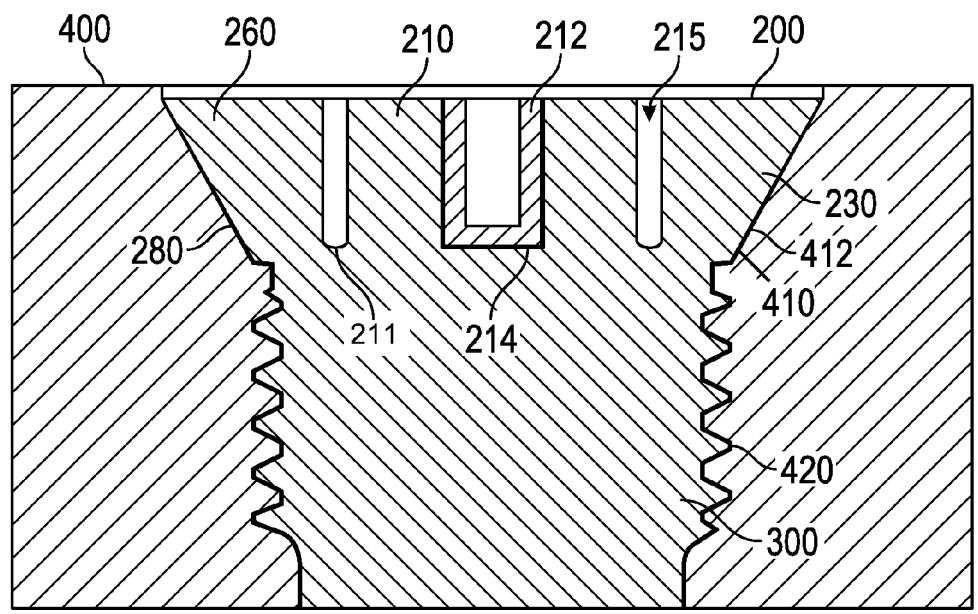
FIG. 4 is a cross-sectional view of the embodiment shown in FIG. 2 along lines 4-4.

The present invention is directed to an improved screw for use in golf club heads, including putters, fairways, drivers, hybrids, irons, and wedges. In particular, it is useful as a weight screw or hosel screw for golf club heads such as the ones disclosed in U.S. Pat. Nos. 8,262,506, 8,403,770, and 8,696,491, the disclosure of each of which is hereby incorporated by reference in its entirety herein, and may have the material composition of any of the screws disclosed in U.S. Pat. Nos. 8,696,283 and 8,753,227, the disclosure of each of which is hereby incorporated by reference in its entirety herein.

In a preferred embodiment, shown in FIGS. 1-4, the golf club screw 100 comprises a head portion 200 and a threaded engagement portion 300. The head portion comprises a stem 210 and a plurality of tapered extensions 220, 230, 240, 250, 260, 270 extending from the base 211 of the stem 210. A circular channel 215 separates the stem 210 from the tapered extensions 220, 230, 240, 250, 260, 270, and a plurality of slots 225, 235, 245, 255, 265, 275 separates the tapered extensions 220, 230, 240, 250, 260, 270 from one another. The tapered extensions 220, 230, 240, 250, 260, 270 are rigid but can flex inwards towards the stem 210 when enough pressure is applied to them at their exterior surfaces 280.

The stem 210 comprises a keyed bore 212 sized to receive a tool, such as a screwdriver or Torx® wrench, and has the greatest amount of mass on the screw 100. As shown in FIG. 1, the keyed bore 212 is a separately formed insert that is added to a recess 214 within the stem 210, and may be made of a material that differs from material of the rest of the screw 100. For example, if a golfer wishes to increase the weight of a steel screw 100, the keyed bore 212 may be made of a denser material such as tungsten or tungsten alloy. The keyed bore 212 preferably is permanently affixed within the recess 214 via welding, brazing, soldering, or an adhesive, but in an alternative embodiment may be removably affixed within the recess 214 with a semi-permanent adhesive or a cap (not shown).

In the preferred embodiment, the golf club screw 100 is engaged with a weight port 400 or other such type of receptacle having a conical portion 410 sized to receive the head portion 200 of the screw 100 and a threaded portion 420 sized to receive the threaded engagement portion 300 of the screw 100. The conical portion 410 has a taper slope 412 that is steeper than the taper slope 280 of the tapered extensions 220, 230, 240, 250, 260, 270, such that when the screw 100 is engaged with the weight port 400 and the threaded engagement portion 300 is threaded into the threaded portion 420 of the weight port 400, the taper slope 412 of the conical portion 410 presses against the taper slope 280 of the tapered extensions 220, 230, 240, 250, 260, 270 and forces the tapered extensions 220, 230, 240, 250, 260, 270 inwards towards the stem 210. This compression of the tapered extensions 220, 230, 240, 250, 260, 270 creates spring tension between the head portion 200 of the screw 100 and the conical portion 410 of the weight port 400. The combination of spring tension between the head portion 200 and the conical portion 410 and the engagement of the threaded engagement portion 300 and the threaded portion 420 serves to securely retain the screw 100 in the weight port 400 when the golf club head is in use.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A golf club head comprising:
    a body comprising a receptacle;
    a screw comprising a head portion and a threaded engagement portion; and
    a keyed bore insert,
    wherein the receptacle comprises a conical portion and a threaded bore,
    wherein the head portion of the screw comprises a recess sized to receive the keyed bore insert,
    wherein the head portion of the screw comprises a plurality of tapered extensions and a plurality of slots,
    wherein each of the plurality of tapered extensions is separated from other tapered extensions by at least two of the plurality of slots,
    wherein at least one of the plurality of tapered extensions comprises a first taper slope,
    wherein the conical portion of the receptacle comprises a second taper slope that is steeper than the first taper slope,
    wherein the head portion of the screw fits within the conical portion of the receptacle,
    wherein the threaded engagement portion of the screw is sized to engage with the threaded bore, and
    wherein the second taper slope compresses the plurality of tapered extensions when the screw is fully engaged with the receptacle.

2. The golf club head of claim 1, wherein the head portion is composed of a first material, wherein the keyed bore insert is composed of a second material, and wherein the first material is different from the second material.

3. The golf club head of claim 1, wherein the keyed bore insert is composed of a tungsten alloy.

4. The golf club head of claim 1, wherein the keyed bore insert is removably affixed within the recess.

5. The golf club head of claim 1, wherein the keyed bore insert is permanently affixed within the recess via a process selected from the group consisting of welding, brazing, and soldering.

6. The golf club head of claim 2, wherein the first material is a steel material and the second material is a tungsten alloy.

* * * * *